(12) United States Patent
Zhu (10) Patent No.: US 11,524,568 B2
(45) Date of Patent: Dec. 13, 2022

(54) ELECTRIC VEHICLE AND THE WHEEL ASSEMBLY THEREOF

(71) Applicant: Robert Bosch GmbH, Stuttgart (DE)

(72) Inventor: Tom Zhu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 16/630,781

(22) PCT Filed: Jun. 21, 2018

(86) PCT No.: PCT/EP2018/066583
§ 371 (c)(1),
(2) Date: Jan. 13, 2020

(87) PCT Pub. No.: WO2019/011614
PCT Pub. Date: Jan. 17, 2019

(65) Prior Publication Data
US 2021/0146771 A1    May 20, 2021

(30) Foreign Application Priority Data

Jul. 14, 2017  (CN) .......................... 201710574267.5

(51) Int. Cl.
*B60K 7/00*  (2006.01)
*B60L 50/00*  (2019.01)
*B60K 17/04*  (2006.01)

(52) U.S. Cl.
CPC .......... *B60K 7/0007* (2013.01); *B60K 17/046* (2013.01); *B60L 50/00* (2019.02);
(Continued)

(58) Field of Classification Search
CPC ................ B60K 7/0007; B60K 17/046; B60K 2007/0038; B60K 2007/0092; B60L 50/00; B60L 2220/46
See application file for complete search history.

(56) References Cited

U.S. PATENT DOCUMENTS 5,691,584 A * 11/1997 Toida ..................... H02K 7/116
310/67 R
7,750,625 B2    7/2010 Wolschlager et al.
(Continued)

FOREIGN PATENT DOCUMENTS

CN    201086808 Y    7/2008
CN    201086828 Y    7/2008
(Continued)

OTHER PUBLICATIONS

International Search Report corresponding to PCT Application No. PCT/EP2018/066583, dated Oct. 4, 2018 (German and English language document) (4 pages).

*Primary Examiner* — Erez Gurari
(74) *Attorney, Agent, or Firm* — Maginot, Moore & Beck LLP (57) ABSTRACT

A wheel assembly for an electric vehicle includes a wheel having a hub and an electric driving system for driving the hub. The electric driving system includes a driving device producing a driving moment. The hub defines an intra-hub space. The electric driving system further includes a speed reducer which is transmission-connected to a downstream side of the driving device and has a speed-reduction function. The electric driving system is coaxially connected to the hub, with at least a part accommodated in the intra-hub space.

10 Claims, 5 Drawing Sheets

(52) U.S. Cl.
CPC ............... *B60K 2007/0038* (2013.01); *B60K 2007/0092* (2013.01); *B60L 2220/46* (2013.01)

(56) References Cited

U.S. PATENT DOCUMENTS

| | | | |
|---|---|---|---|
| 8,419,581 B2 | 4/2013 | Lo | |
| 10,876,596 B1* | 12/2020 | Bonny | F16D 65/186 |
| 11,211,844 B1* | 12/2021 | Bonny | H02K 7/116 |
| 11,235,661 B1* | 2/2022 | Bonny | F16H 57/031 |
| 11,241,926 B2* | 2/2022 | Takenaka | B60K 7/00 |
| 2007/0078035 A1* | 4/2007 | Oshidari | F16H 1/46 |
| | | | 475/149 |
| 2007/0181357 A1* | 8/2007 | Saito | B60K 7/0007 |
| | | | 180/65.51 |
| 2008/0202832 A1* | 8/2008 | Ai | B60K 17/046 |
| | | | 180/65.51 |
| 2010/0326748 A1* | 12/2010 | Sgherri | B60K 17/046 |
| | | | 301/6.5 |
| 2011/0133541 A1* | 6/2011 | Makino | F16H 1/32 |
| | | | 301/6.5 |
| 2011/0297493 A1* | 12/2011 | Vollert | B60T 7/042 |
| | | | 188/106 R |
| 2012/0222906 A1* | 9/2012 | Yamamoto | B66F 9/07509 |
| | | | 475/149 |
| 2012/0312608 A1* | 12/2012 | Baumgartner | B60K 7/0007 |
| | | | 301/6.5 |
| 2013/0048394 A1 | 2/2013 | Su et al. | |
| 2013/0057048 A1* | 3/2013 | Ishikawa | B60L 7/24 |
| | | | 301/6.5 |
| 2013/0057117 A1* | 3/2013 | Suzuki | B60K 7/0007 |
| | | | 310/60 R |
| 2015/0123452 A1* | 5/2015 | Boeer | B60K 7/0007 |
| | | | 301/6.5 |
| 2015/0231959 A1* | 8/2015 | Ishikawa | B60K 17/145 |
| | | | 301/6.5 |
| 2021/0070163 A1* | 3/2021 | Yada | B60B 27/0015 |

FOREIGN PATENT DOCUMENTS

| | | | | |
|---|---|---|---|---|
| CN | 103442918 A | 12/2013 | | |
| CN | 103448537 A | 12/2013 | | |
| CN | 105782365 A | 7/2016 | | |
| CN | 105946589 A | 9/2016 | | |
| EP | 1 362 736 A1 | 11/2003 | | |
| EP | 1932706 A2 * | 6/2008 | ......... | B60K 17/046 |
| JP | 2002-247713 A | 8/2002 | | |
| JP | 2012-183980 A | 9/2012 | | |
| WO | 2015/105097 A1 | 7/2015 | | |
| WO | WO-2016002287 A1 * | 1/2016 | ......... | B60B 27/0052 |
| WO | 2016/082629 A1 | 6/2016 | | |
| WO | WO-2019196395 A1 * | 10/2019 | ......... | B60K 17/046 |

* cited by examiner

ELECTRIC VEHICLE AND THE WHEEL ASSEMBLY THEREOF

This application is a 35 U.S.C. § 371 National Stage Application of PCT/EP2018/066583, filed on Jun. 21, 2018, which claims the benefit of priority to Serial No. CN 201710574267.5, filed on Jul. 14, 2017 in China, the disclosures of which are incorporated herein by reference in their entirety.

The disclosure relates to a wheel assembly for an electric vehicle. In addition, the disclosure also relates to an electric vehicle including the wheel assembly.

BACKGROUND

With the research, development, and popularization of new energy vehicles in the world, the electric driving system is more and more widely applied. Among various electric driving schemes, near-wheel mounting is a commonly adopted scheme. Near-wheel mounting means that the electric driving system is coaxially mounted beside a wheel. Such a mounting mode determines that the near-wheel electric driving system is usually a direct driving system, that is to say, the motor is directly connected to the wheel to directly provide the driving moment for the wheel.

Although it is easy to realize such a direct electric driving system, the direct electric driving system cannot provide a large driving moment or a high power density. In order to improve the output moment and the power density of the electric driving system, a preferred solution is to add a speed reducer having the speed-reducing function to the electric driving system. However, the known speed reducers in the prior art are not suitable for being used in a near-wheel mounted electric driving system because the size of the known speed reducers is usually so large that the overall size of the electric driving system will increase significantly. In addition, the mounting space available to the near-wheel electric driving system in a vehicle is very limited.

SUMMARY

The objective of the disclosure is to provide a wheel assembly having a near-wheel mounted electric driving system. The wheel assembly not only has a large driving moment and a high power density, but also effectively utilizes the intra-hub space to mount the electric driving system, and thus the wheel assembly has notable structure compactness.

According to one aspect of the disclosure, the above-mentioned objective is realized by a wheel assembly for an electric vehicle. Said wheel assembly comprises a wheel having a hub and an electric driving system used for driving said hub, wherein said electric driving system comprises a driving device producing a driving moment and said hub defines an intra-hub space. Said electric driving system further comprises a speed reducer which is transmission-connected to the downstream side of said driving device and has the speed-reduction function, and said electric driving system is coaxially connected to said hub, with at least a part of said electric driving system accommodated in said intra-hub space.

In a preferred embodiment, said electric driving system is connected to said hub, with most or all of said speed reducer accommodated in said intra-hub space.

In another preferred embodiment, said electric driving system is directly connected to said hub.

In a third preferred embodiment, said electric driving system further comprises a hub coupling member which realizes the direct connection of said electric driving system and said hub, and said hub coupling member comprises an axial extension rod which is used to cooperate with the system output shaft of said electric driving system without any relative rotation and a radial extension plate which is located at the end of said axial extension rod and is used to cooperate with said hub without any relative rotation.

In a fourth preferred embodiment, said system output shaft has an accommodation hole used to accommodate said axial extension rod of said hub coupling member, wherein said accommodation hole extends in the axial direction of said system output shaft to the hub-facing axial end face of said system output shaft.

In other preferred embodiments, said hub coupling member further comprises a step portion which is used to define the insertion depth of said axial extension rod in said accommodation hole, and said step portion is set up at the transitional corner portion between said axial extension rod and said radial extension plate.

In a preferred embodiment, a concave accommodation portion for accommodating said radial extension plate is set up at the centre of said hub, and said radial extension plate is assembled in said concave accommodation portion by shape locking and/or force locking.

In another preferred embodiment, said speed reducer comprises a level-1 planet gear portion transmission-connected to the driving device output shaft of said driving device and a level-2 planet gear portion transmission-connected to the downstream side of said level-1 planet gear portion, wherein said level-2 planet gear portion comprises a rotatable level-2 gear ring, and said level-2 gear ring is connected to the system output shaft of said electric driving system without any relative rotation to provide a driving moment for said system output shaft.

Preferably, said level-1 planet gear portion and said level-2 planet gear portion share a stationary planet carrier, one end of said system output shaft is rotatably supported in the central opening in said planet carrier, and the other end is rotatably supported in the central through-hole in the hub-facing wall of the casing of said speed reducer.

In particular, said speed reducer further comprises a connecting plate which is used to realize a no-relative-rotation connection between said level-2 gear ring and said system output shaft, said connecting plate is fixed to the hub-facing axial surface of said level-2 gear ring and a through-hole for said system output shaft to extend through is set up at the centre of the connecting plate, and in addition, said system output shaft is fixed to said connecting plate with the aid of the outer flange located on the outer side wall of said system output shaft.

According to the other aspect of the disclosure, the above-mentioned objective is realized by an electric vehicle including the wheel assembly having the above-mentioned characteristics.

BRIEF DESCRIPTION OF THE DRAWINGS

The characteristics and advantages of the disclosure can further be understood by reading the detailed description of the following exemplary preferred embodiments by reference to the drawings. In the drawings.

DETAILED DESCRIPTION

In this application document, the same reference number refers to the same or similar component or element.

The directional terms used in this application document, such as "front", "rear", "left", "right", "upper", "lower", "top", and "bottom", are all described by reference to the positions and directions of the components shown in the drawings. These terms are only used to more clearly describe the relative positions of the components, but are not used to define their absolute positions.

In addition, unless otherwise specified, the term "axial" used in this application document refers to a direction parallel to or overlapping the wheel axis, while the terms "radial" and "circumferential" are the corresponding directions determined on the basis of the direction of the wheel axis.

Unless otherwise specified, the terms used in this application document, such as "directly connected", "directly mounted", "directly fixed", and similar expressions mean that there is no third component or device, or no intermediate component or device between two connected components or devices.

Figure 1:
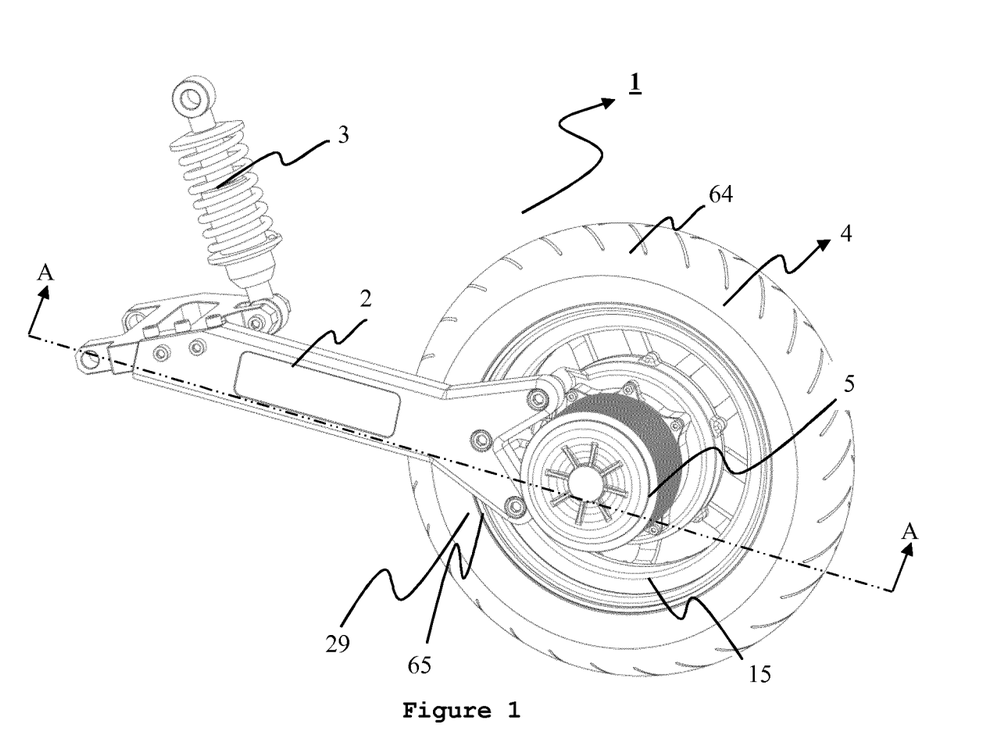
FIG. 1 is a 3-D view of a part of the electric vehicle having the electric driving system 5 in one embodiment of the disclosure.

FIG. 1 is a 3-D view of a part of an electric vehicle. This part reflects the major technical conceptions of the disclosure and mainly comprises a wheel assembly 1, a support frame 2 used to position the wheel assembly 1, and a shock absorber 3 used to absorb shocks. The wheel assembly 1 comprises a wheel 4 and an electric driving system 5 mounted on the wheel 4 to provide a driving moment for the wheel 4.

Here, it should be noted that although the electric vehicle shown in FIG. 1 is a two-wheeled electric vehicle, the term "electric vehicle" used in this document is not limited to a two-wheeled electric vehicle, and can be any proper types of vehicles driven electrically, for example, four-wheeled electric vehicle (such as pure electric vehicle and hybrid vehicle), two-wheeled electric scooter, and even electric wheelbarrow.

Figure 2:
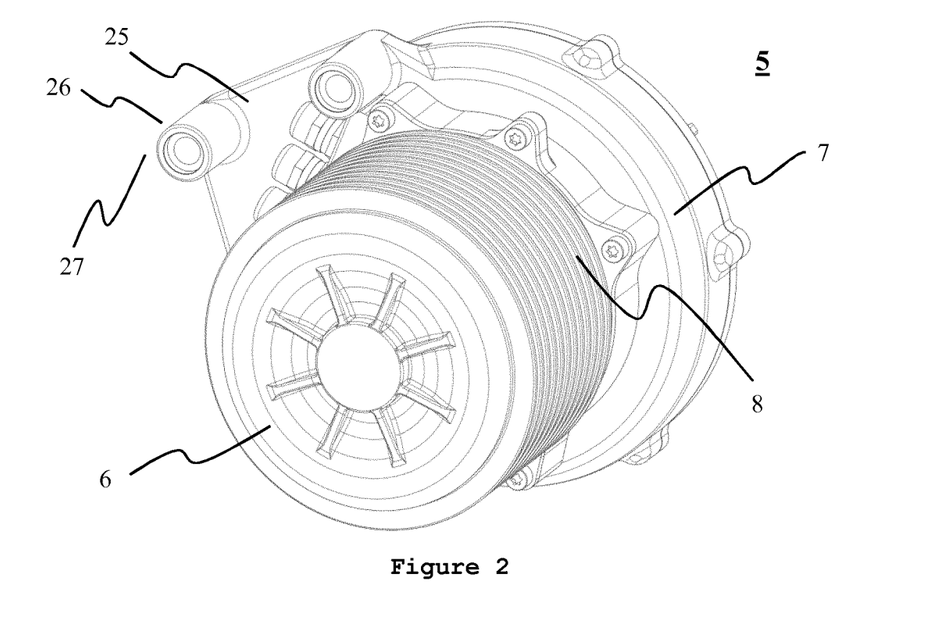
FIG. 2 is a front 3-D view of the electric driving system 5 in the embodiment of the disclosure
Figure 3:
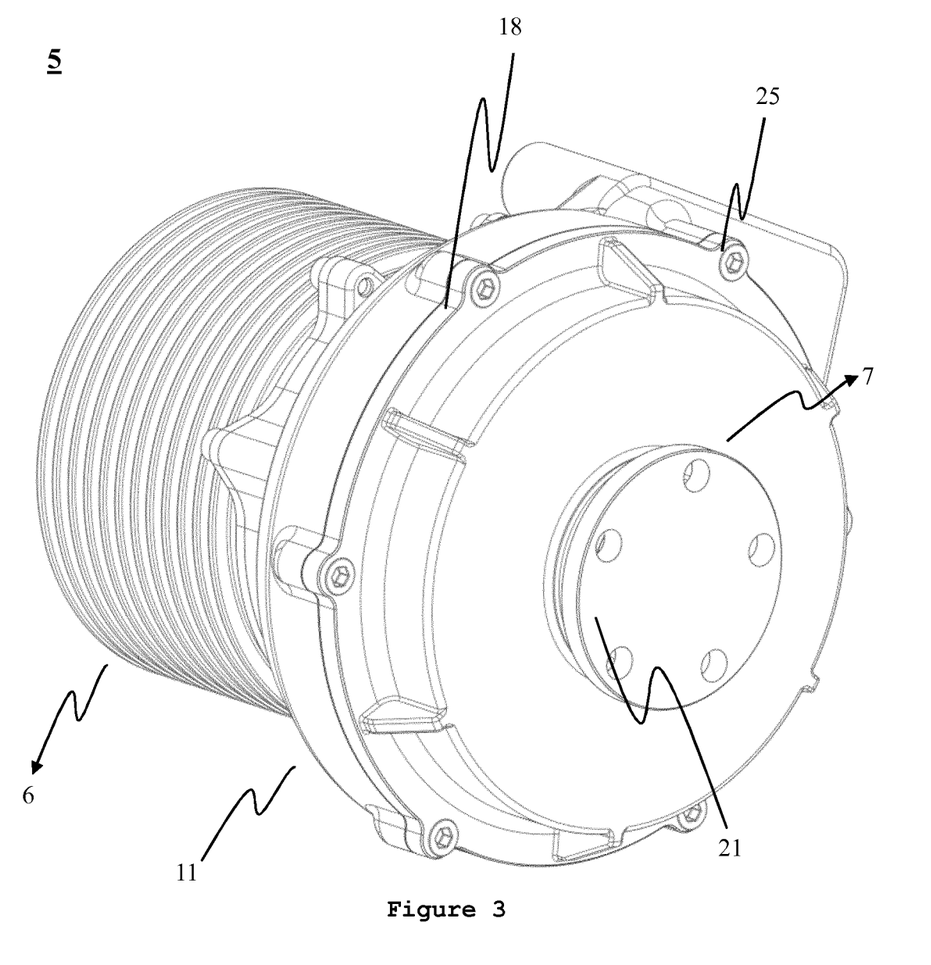
FIG. 3 is a side rear 3-D view of the electric driving system 5 shown in FIG. 2.
Figure 4:
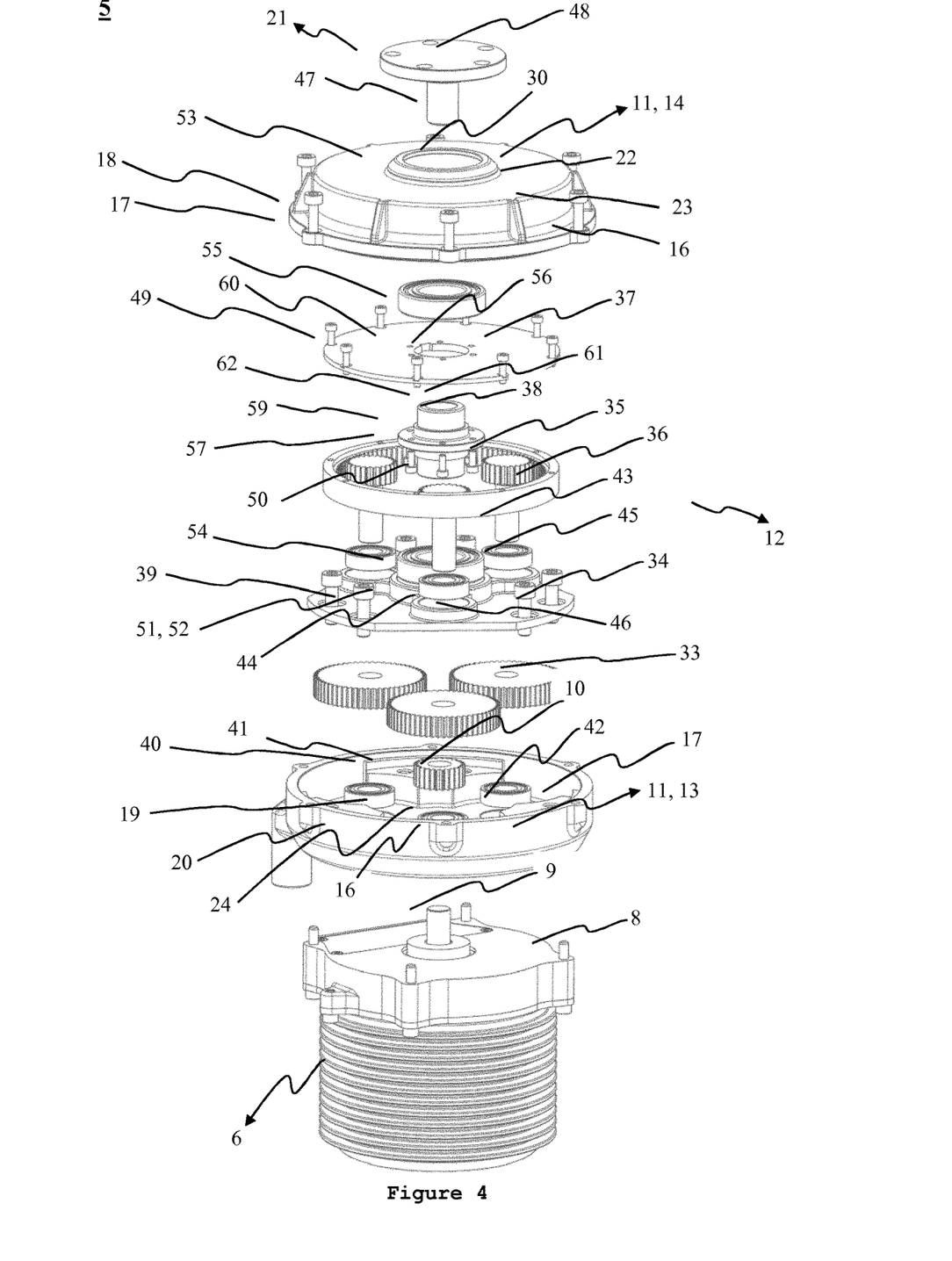
FIG. 4 is an exploded view of the electric driving system 5 shown in FIG. 2.
Figure 5:
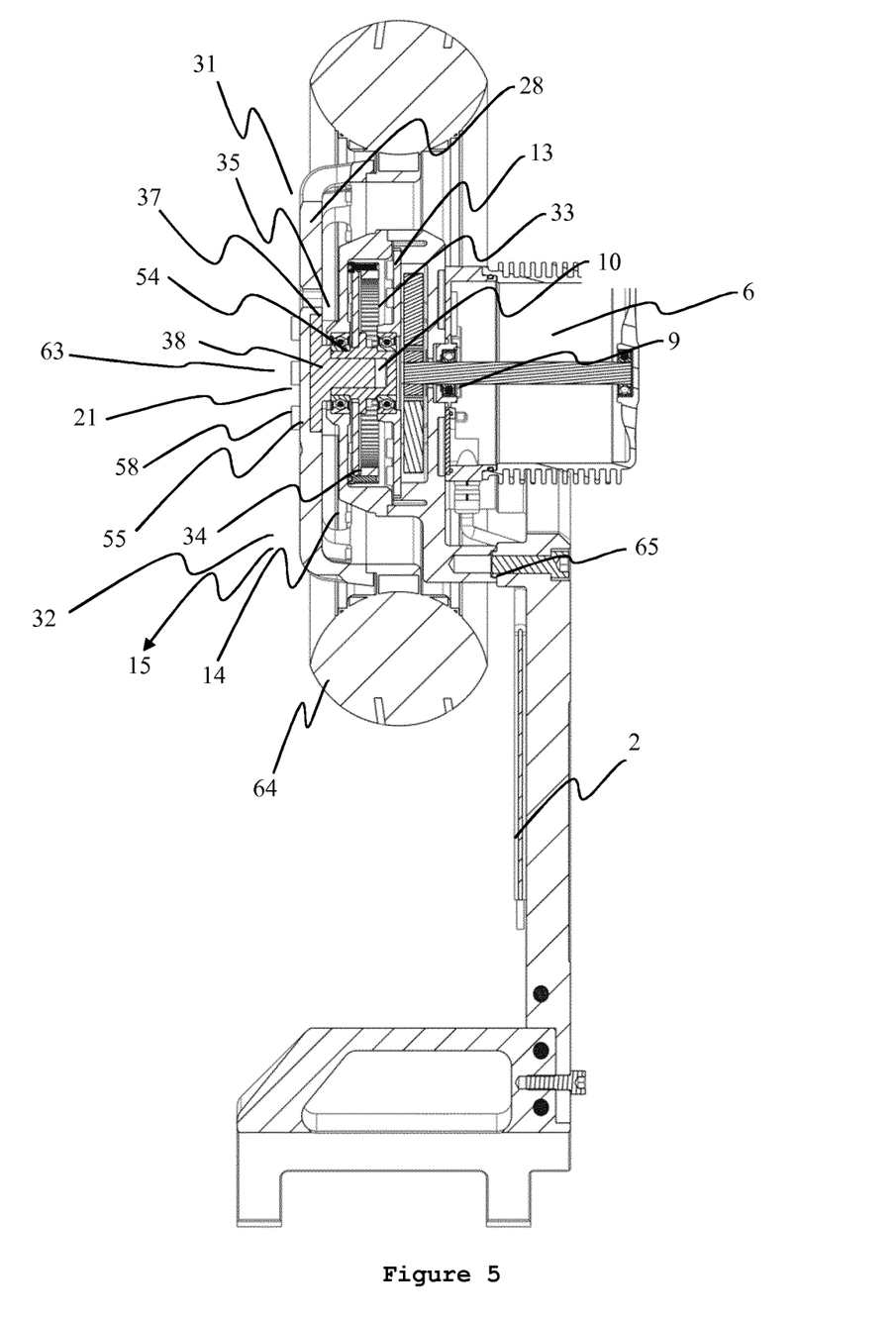
FIG. 5 is a cutaway view of the electric vehicle in the A-A direction in FIG. 1.
Figure 6:
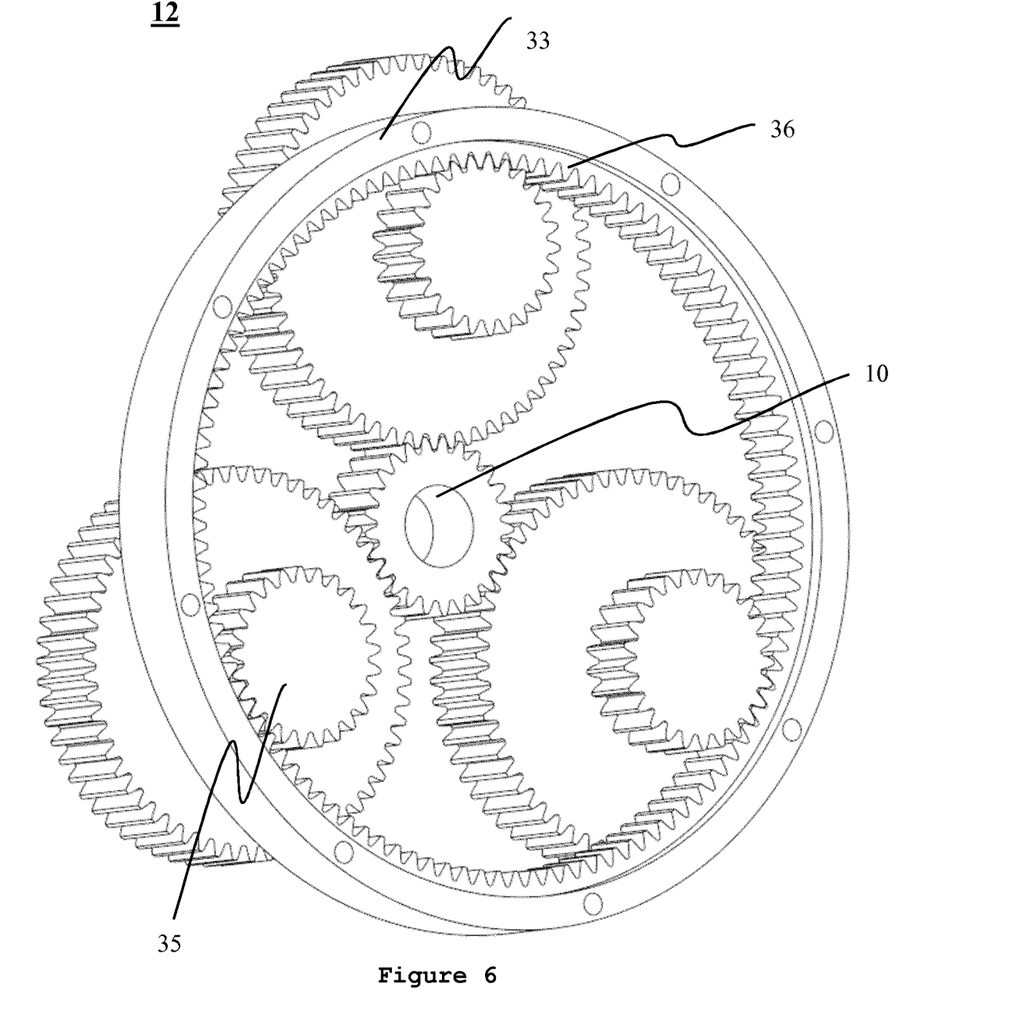
FIG. 6 is a reduced graph of the planet gear assembly 12 in the electric driving system 5 shown in FIG. 2.

The following will describe in detail the electric driving system 5 in the disclosure in combination with FIGS. 2 to 6. FIG. 2 is a front 3-D view of the electric driving system 5 in one embodiment of the disclosure, FIG. 3 is a side read 3-D view of the electric driving system 5 shown in FIG. 2, FIG. 4 is an exploded view of the electric driving system 5 shown in FIG. 2, FIG. 5 is a cutaway view of the electric vehicle in the A-A direction in FIG. 1, and FIG. 6 is a reduced graph of the planet gear assembly 12 in the electric driving system 5 shown in FIG. 2.

As shown in FIGS. 2 to 6, the electric driving system 5 in the present invention disclosure is constructed into an overall module which can directly be attached to a wheel 4 and particularly comprises a driving device 6 and a speed reducer 7 transmission-connected to the downstream side of the driving device 6. The driving device 6 is constructed to produce and output driving motions and is also used to generate electricity to recover braking energy, while the speed reducer 7 is constructed to receive the driving motions output by the driving device 6, reduce the speed, and output the speed to the external components, for example, load for example, wheel 4).

Here, the connection between the driving device 6 and the speed reducer 7 is reflected in at least two aspects. In the first aspect, there is a mechanical connection between the driving device 6 and the speed reducer 7. As shown in FIG. 2, the driving device 6 and the speed reducer 7 are mechanically connected together by use of a bolt 8. Of course, other proper mechanical connection means can also be used as an assistance to or substitution for the bolt 8. In the second aspect, there is a kinetic connection between the driving device 6 and the speed reducer 7, that is to say, there is a direct or indirect transmission of power or motion between the driving device 6 and the speed reducer 7. As shown in FIG. 5, with the aid of the fit connection between the driving device output shaft 9 of the driving device 6 and the level-1 sun gear 10 of the speed reducer 7, the driving motion produced by the driving device 6 is transmitted to the speed reducer 7.

The driving device 6 can be constructed to be any proper type of motor which can convert electric energy into mechanical energy. The structure and operational principle of the motor can be obtained from the prior art, and therefore they are not described again here.

As shown in FIGS. 4 and 5, the speed reducer 7 comprises a casing 11 and a planet gear assembly 12 accommodated in the casing 11. The casing 11 consists of two basin-like or circular-basin-like casing portions 13 and 14. The connection between the first casing portion 13 and the second casing portion 14 can be realized by use of any proper mechanical connection means. In the exemplified embodiment, a plurality of projections 16 corresponding to each other are set up on the outer surfaces of the side walls of the first and second casing portions 13 and 14, a corresponding hole 17 is opened in the projections 16, and the two casing portions are connected together by screwing on a bolt 18 in the holes 17 in the first and second casing portions 13 and 14.

In addition, as shown in FIGS. 1 and 5, when the electric driving system 5 is mounted on the wheel 4, the cylindrical axis of the casing 11 is roughly parallel to or overlaps the central axis of the wheel 4, that is to say, the casing 11 is so positioned that the end wall of one of the casing portions 13 and 14 (end wall 22 of the second casing portion 14 in the embodiments shown in FIGS. 1 and 5) faces the hub 15 of the wheel assembly 1, while the end wall of the other casing portion (end wall 19) of the first casing portion 13 in the embodiments shown in FIGS. 1 and 5) is opposite to the hub 15.

Furthermore, the first casing portion 13 has a first end wall 1) and a first side wall 20. A first through-hole 24 allowing the driving device output shaft 9 to extend through is opened in the first end wall 19, and said first through-hole 24 is particularly located at the centre of the first end wall 19. Thus, the driving device output shaft 9 can pass through the first through-hole 24 and extend into the casing 11 to fit-connect to the level-1 sun gear 10 in the casing 11. Similarly, the second casing portion 14 has a second end wall 22 and a second side wall 23, and a second through-hole 30 which the hub coupling member 21 (which will be described in detail later) is inserted into is opened in the second end wall 22.

In addition, in order to utilize the bolt 8 to fix the driving device 6 to the speed reducer 7, a hole (not shown in the figures) used to accommodate the bolt 8 is opened in the outer surface of the first end wall 19.

A connection structure is further set up on the first casing portion 13 to realize the connection between the electric driving system 5 and the support frame 2. As shown in FIGS. 1 to 3, a radial extension portion 25 roughly in the shape of a triangle is set up on the outer side of the first casing portion 13, and an axial bulge 26 having a threaded hole 27 is set up at the three corners of the radial extension portion 25, respectively.

Accordingly, three openings 29 are set up at the end of the support frame 2. Thus, with the aid of the cooperation of the bolt 65 with the opening 29 and the threaded hole 27, the attachment of the electric driving system 5 to the support frame 2 is realized.

As shown in FIGS. 4 to 6, the planet gear assembly 12 consists of two levels of planet gear portions, namely, a level-1 planet gear portion and a level-2 planet gear portion. The level-1 planet gear portion comprises a level-1 sun gear 10 which is transmission-connected to the driving device output shaft 9 and is driven by the driving device output shaft 9 and level-1 planet gears 33 which engage with the level-1 sun gear 10 and are driven by the level-1 sun gear 10. The level-2 planet gear portion comprises level-2 planet gears 35 which are transmission-connected to level-1 planet gears 33, a level-2 gear ring (36) which engages with level-2 planet gears 35 and is driven by the level-2 planet gears 35, a connecting plate 37 which is fixed to the level-2 gear ring 36 and is driven by the level-2 gear ring 36, and a system output shaft 38 which is fixed to the connecting plate 37 and is driven by the connecting plate 37 to provide a driving moment for a load, for example, wheel 4. Particularly, the level-1 planet gears 33 and the level-2 planet gears 35 share a stationary planet carrier 34.

The following will further describe in detail the structure of the speed reducer 7 in combination with FIGS. 4 and 5.

The level-1 sun gear 10 and at least one level-1 planet gear 33 (three level-1 planet gears in the embodiments shown in the figures) engaging with the level-1 sun gear 10 are accommodated in the first casing portion 13. In addition, the driving device output shaft 9 passes through the first through-hole 24 in the first end wall 19 of the first casing portion 13 and extends into the central hole of the level-1 sun gear 10 to connect the level-1 sun gear 10, without any relative rotation. The level-1 planet gears 33 are distributed at equal intervals around the level-1 sun gear 10.

In addition, the planet carrier 34 is also accommodated in the first casing portion 13. The planet carrier 34 is fixed to at least one fixing table (three fixing tables in the embodiments shown the figures) in the first casing portion 13 by use of the bolts 39. Particularly, said at least one fixing table 40 is distributed circumferentially at equal intervals on the first end wall 19 in the first casing portion 13 and the shape of the fixing tables are constructed to be similar to a trapezoid. A hole 41 used to accommodate the bolt 39 is opened in the axial top surface 42 of the fixing table 40. Thus, the level-1 planet carrier 34 can be fixed to the axial top surface 42 by use of the bolts 39. In addition, in order to at least partially accommodate the assembled planet carrier 34 in the first casing portion 13, the height of the axial top surface 42 of said at least one fixing table 40 is less than the height of the first end wall 19 (it can clearly be viewed from FIG. 4) so that a space for accommodating the planet carrier 34 is reserved on the fixing table 40.

In the embodiments shown in the figures, particularly, a level-1 planet gear 33 is positioned between every two circumferentially adjacent fixing tables 40, while the level-1 sun gear 10 is positioned on the radial inner side of the fixing tables 40, namely, in the central space enclosed by the three fixing tables 40. In addition, in the assembled state, the top surfaces of the level-1 sun gear 10 and the level-1 planet gears 33 are basically flush with the axial top surfaces 42 of the fixing tables 40, or slightly lower than the axial top surfaces 42 of the fixing tables 40 (it can clearly be viewed from FIG. 5).

In addition, the shape of the planet carrier 34 can be designed into a shape different from the cross section of the first casing portion 13. Particularly, the cross section of the first casing portion 13 is roughly designed into a circle and the shape of the planet carrier 34 is designed into a non-rotational symmetrical shape, thus saving the material of the planet carrier 34 and reducing the total weight of the system.

What is arranged above the planet carrier 34 is the level-2 planet gears 35 accommodated in the second casing portion 14 and the level-2 gear ring 36 engaging with the level-2 planet gears 35. The moment transmission between the level-1 planet gear portion and the level-2 planet gear portion is realized by the connecting member 43 connected between a level-1 planet gear 33 and the corresponding level-2 planet gear 35. In the embodiments shown in the figures, the connecting member 43 is constructed into a cylinder and extends through the hole 44 in the planet carrier 34. In addition, one end of the connecting member 43 below the planet carrier 34 is inserted into the central hole in the level-1 planet gear 33, without any relative rotation, while the other end above the planet carrier 34 is inserted into the central hole in the level-2 planet gear 35, without any relative rotation. Furthermore, the connecting member 43 can rotatably be supported in the hole 44 with the aid of the corresponding bearing 45. To this end, an annular axial flange 46 extending along the circumference of the hole 44 is constructed at each hole 44 in the top surface of the planet carrier 34. Thus, the bearing 45 is accommodated in the corresponding axial flange 46, and the inner side surface of the axial flange 46 together with the inner side surface of the hole 44 forms an enlarged support surface for the connecting member 43.

Furthermore, what is arranged above the level-2 planet gears 35 and the level-2 gear ring 36 is the connecting plate 37 used to transmit the moment of the level-2 gear ring 36 to the system output shaft 38. The connecting plate 37 is roughly constructed into a circular plate and the diameter of the connecting plate is roughly equal to the outside diameter of the level-2 gear ring 36. The connecting plate 37 is fixed to the top surface of the level-2 gear ring 36 by use of the bolts 49, while the system output shaft 38 extends through the through-hole 56 opened at the centre of the connecting plate 37 and is fixed to the connecting plate 37 by use of the bolts 50.

A central opening 51 for accommodating the end of the system output shaft 38 is opened at the centre of the planet carrier 34. Similar to the holes 44, a central flange 52 extending along the circumference of the central opening 51 is also accordingly set up at the central opening 51 so that the planet carrier 34 can more steadily support and position the system output shaft 38. In addition, an axially-outward and/or axially-inward annular flange 53 extending along the circumference of the second through-hole 30 is also accordingly set up at the second through-hole 30 in the second casing portion 14 (see FIGS. 4 and 5). In the assembled state, the system output shaft 38 extends through the through-hole 56 in the connecting plate 37, and in addition, one end of the system output shaft 38 below the connecting plate 37 is accommodated in the central flange 52 and is rotatably supported on the inner side wall of the central flange 52 with the aid of the bearing 54, while the opposite end of the system output shaft 38 above the connecting plate 37 is accommodated in the second through-hole 30 and is rotatably supported on the inner side wall of the second through-hole 30 with the aid of the bearing 55.

In addition, an outer flange 57 is set up in the middle of the outer side wall of the system output shaft 38. In the assembled state, the top surface of the outer flange 57 just touches against the bottom surface of the connecting plate 37 (see FIG. 5). In this way, the fixing and connection between the system output shaft 38 and the connecting plate 37 can be realized by screwing bolts 50 into the openings 59 in the outer flange 57 and the corresponding openings 60 in the connecting plate 37.

In addition, the electric driving system 5 in the present invention disclosure fitrther comprises a hub coupling member 21 for directly transmission-cor'n ecting the electric driving system 5 to the hub 15. To this end, an accommodation hole 62 for accommodating the hub coupling member 21 is set up in the system output shaft 38, and said accommodation hole 62 extends in the axis direction of the system output shaft 38 to the hub 15 facing axial end face 61 of the system output shaft 38. Thus, the hub coupling member 21 can be inserted into the syst m output shaft 38 to be locked together with the system output shaft 38 by force fit and/or shape fit.

Particularly, the hub coupling member 21 comprises an axial extension rod 47 which is used for a fit connection with the accommodation hole 62 and a radial extension plate 48 which is located at the hub 15 facing end of the axial extension rod 47 and is used for a fit connection with the hub 15. In the assembled state, the axial extension rod 47 of the hub coupling member 21 is inserted from the second through-hole 30 in the outer side of the second casing portion 14 into the accommodation hole 62 in the system output shaft 38, while the radial extension plate 48 remains outside the second casing portion 14 to form a fit connection with the hub 15.

Preferably, a step portion 58 is set up at the transitional corner portion between the axial extension rod 47 and the radial extension plate 48 to define the insertion depth of the axial extension rod 47 in the accommodation hole 62. Thus, during the insertion of the hub coupling member 21 into the system output shaft 38, the axial extension rod 47 can be inserted inward along the accommodation hole 62 until the step portion 58 touches against the bearing 55 and/or the system output shaft 38 (see FIG. 5).

In addition, the radial extension plate 48 of the hub coupling member 21 can be fixed to the hub 15 in any proper way. In the embodiments shown in the figures, the radial extension plate 48 is imbedded in the concave accommodation portion 63 at the centre of the hub 15 by shape fit or force fit.

The speed reducer 7 having the above-mentioned characteristics has a compact axial dimension. Thus, when the speed reducer is connected to the downstream side of the driving device 6, the overall axial dimension of the electric driving system 5 is not significantly increased, but the output moment and the power density of the electric driving system. 5 are effectively improved.

The following will describe in detail the operational principle of the speed reducer 7 in combination with FIGS. 4 to 6.

First, the level-1 sun gear 10 is driven by the driving device output shaft 9 to make rotations around the axis (namely, "auto-rotations"). Then, the level-1 sun gear 10 drives the level-1 planet gears 33 to rotate around the level-1 sun gear 10 (namely, "revolutions") with the aid of the engagements between the level-1 sun gear 10 and the level-1 planet gears (33). Further, the rotations of the level-1 planet gears 33 around the level-1 sun gear 10 are transmitted to the level-2 planet gears 35 via the connecting members 43. Then, the level-2 planet gears 35 drive the level-2 gear ring 36 to make rotations with the aid of the engagements between the level-2 planet gears 35 and the level-2 gear ring 36. Then, the rotations of the level-2 gear ring 36 are transmitted to the system output shaft 38 with the aid of the connecting plate 37. Finally, the rotations of the system output shaft 38 are output to the hub 15 with the aid of the hub coupling member 21.

Besides the favourable structure design of the electric driving system 5, another favourable design of the present invention disclosure is the way of positioning the electric driving system 5 on the wheel 4.

As shown in FIG. 5, the wheel 4 comprises a hub 15 and a tyre 64, wherein the hub 15 has a hub circumferential portion 31 and a hub radial portion 32, and the hub circumferential portion 31 and the hub radial portion 32 jointly define an intra-hub space 28. In the assembled state, preferably, at least a part of the electric driving system 5 is accommodated in the intra-hub space 28; more preferably, the speed reducer 7 of the electric driving system 5 is basically completely accommodated in the intra-hub space 28; more preferably, the speed reducer 7 of the electric driving system 5 is basically completely accommodated in the intra-hub space 28 and at least a part of the driving device 6 of the electric driving system 5 is accommodated in the intra-hub space 28.

Through the intra-wheel positioning way, the intra-hub space is effectively utilized so that the wheel assembly 1 has a compact space structure as a whole. In other words, the structure compactness of the electric driving system 5 having the above-mentioned characteristics provides feasibility for the intra-wheel position way, and the intra-wheel positioning way further improves the overall compactness of the system on the basis of the existing compactness of the electric driving system 5.

Although some embodiments have been described, these embodiments are presented only for illustration purposes and are not intended to limit the scope of the present invention disclosure. The attached claims and their equivalent forms aim at covering all variants, substitutions, and changes falling within the scope and spirit of the present invention disclosure.

DESCRIPTION OF REFERENCE NUMBERS IN THE DRAWINGS

1 Wheel assembly
2 Support frame
3 Shock absorber
4 Wheel
5 Electric driving system
6 Driving device
7 Speed reducer
8 Bolt
9 Driving device output shaft
10 Level-1 sun gear
11 Casing
12 Planet gear assembly
13 First casing portion
14 Second casing portion
15 Hub 16 Projection
17 Hole
18 Bolt
19 First end wall
20 First side wall
21 Hub coupling member
22 Second end wall
23 Second side wall
24 First through-hole
25 Radial extension portion
26 Axial bulge
27 Threaded hole
28 Intra-hub space
29 Opening
30 Second through-hole
31 Hub circumferential portion
32 Hub radial portion
33 Level-1 planet gear
34 Planet carrier
35 Level-2 planet gear
36 Level-2 gear ring
37 Connecting plate
38 System output shaft
39 Bolt
40 Fixing table
41 Hole
42 Axial top surface
43 Connecting member
44 Hole
45 Bearing
46 Axial flange
47 Axial extension rod
48 Radial extension plate
49 Bolt
50 Bolt
51 Central opening
52 Central flange
53 Flange
54 Bearing
55 Bearing
56 Through-hole
57 Outer flange
58 Step portion
59 Opening
60 Opening
61 Axial end face
62 Accommodation hole
63 Concave accommodation portion
64 Tyre
65 Bolt

The invention claimed is:

1. A wheel assembly for an electric vehicle, comprising:
a wheel having a huh defining an intra-hub space; and
an electric driving system configured to drive said hub,
said electric driving system including;
a driving device configured to produce a driving moment;
a speed reducer which is transmission-connected to a downstream side of said driving device and has a speed-reduction function; and
a hub coupling member configured to realize the direct connection of said electric driving system and said hub of said wheel, said hub coupling member including (i) an axial extension rod configured to cooperate with a system output shaft of said electric driving system without any relative rotation, and (ii) a radial extension plate located at an end of said axial extension rod and configured to cooperate with said hub without any relative rotation,
wherein said electric driving system is coaxially connected to said hub, with at least a part of said electric driving system accommodated in the intra-hub space.

2. The wheel assembly according to claim 1, wherein said electric driving system is connected to said hub with most or all of said speed reducer accommodated in said intra-hub space.

3. The wheel assembly according to claim 1 wherein:
said system output shaft has an accommodation hole configured to accommodate said axial extension rod of said hub coupling member, and
said accommodation hole extends in an axial direction of said system output shaft to a hub-facing axial end face of said system output shaft.

4. The wheel assembly according to claim 3, wherein:
said hub coupling member further comprises a step portion configured to define an insertion depth of said axial extension rod in said accommodation hole, and
said step portion is set up at a transitional corner portion between said axial extension rod and said radial extension plate.

5. The wheel assembly according to claim 1, further comprising:
a concave accommodation portion configured to accommodate said radial extension plate is set up at a centre of said hub,
wherein said radial extension plate is assembled in said concave accommodation portion by shape locking and/or force locking.

6. A wheel assembly for an electric vehicle, comprising:
a wheel having a hub defining an intra-hub space and
an electric driving system configured to drive said hub,
said electric driving system including;
a driving device configured to produce a driving moment, and
a speed reducer which is transmission-connected to a downstream side of said driving device and has a speed-reduction function,
wherein said electric driving system is coaxially connected to said wheel hub, with at least a part of said electric driving system accommodated in the intra-hub space, and;
wherein;
said speed reducer includes a level-1 planet gear portion transmission-connected to a driving device output shaft of said driving device and a level-2 planet gear portion transmission-connected to a downstream side of said level-1 planet gear portion,
said level-2 planet gear portion includes a rotatable level-2 gear ring, and
said rotatable level-2 gear ring is connected to the system output shaft of said electric driving system without any relative rotation to provide a driving moment for said system output shaft.

7. The wheel assembly according to claim 6, wherein:
said level-1 planet gear portion and said level-2 planet gear portion share a stationary planet carrier.

8. The Wheel assembly according to claim 6, wherein:
said speed reducer further comprises a connecting plate configured to realize a no-relative-rotation connection between said level-2 gear ring and said system output shaft,
said connecting plate is fixed to a hub facing axial surface of said level-2 gear ring, a through-hole for said system output shaft to extend through is set up at a centre of the connecting plate, and
said system output shaft is fixed to said connecting plate with an outer flange located on an outer side wall of said system output shaft.

9. The wheel assembly according to claim 7, wherein one end of said system output shaft is rotatably supported in a central opening in said planet carrier, and another end of said system output shaft is rotatably supported in a central through-hole in a hub facing wall of a casing of said speed reducer.

10. An electric vehicle comprising:
a wheel assembly including (i) a wheel having a hub defining an intra-hub space, and (ii) an electric driving system configured to drive said hub, said electric driving system including:
a driving device configured to produce a driving moment
a speed reducer which is transmission-connected to a downstream side of said driving device and has a speed-reduction function; and
a hub coupling member configured to realize the direct connection of said electric driving system and said hub, said hub coupling member including (i) an axial extension rod configured to cooperate with a system output shaft of said electric driving system without any relative rotation, and a radial extension plate located at an end of said axial extension rod and configured to cooperate with said hub without any relative rotation,
wherein said electric driving system is coaxially connected to said hub, with at least a part of said electric driving system accommodated in the intra-hub space.

* * * * *

UNITED STATES PATENT AND TRADEMARK OFFICE
CERTIFICATE OF CORRECTION

| | |
|---|---|
| PATENT NO. | : 11,524,568 B2 |
| APPLICATION NO. | : 16/630781 |
| DATED | : December 13, 2022 |
| INVENTOR(S) | : Zhu |

It is certified that error appears in the above-identified patent and that said Letters Patent is hereby corrected as shown below:

In the Claims

In Claim 1, at Column 9, Line 53: "huh" should read --hub--.

In Claim 6, at Column 10, Line 34: "intra-hub space and" should read --intra-hub space; and--.

In Claim 6, at Column 10, Line 45: "and;" should read --and--.

In Claim 10, at Column 11, Line 26: "and a radial extension plate" should read --and (ii) a radial extension plate--.

Signed and Sealed this
Twenty-third Day of May, 2023

Katherine Kelly Vidal
*Director of the United States Patent and Trademark Office*